(12) United States Patent
Basrani

(10) Patent No.: US 11,630,803 B2
(45) Date of Patent: Apr. 18, 2023

(54) PERSISTENT INDEXING AND FREE SPACE MANAGEMENT FOR FLAT DIRECTORY

(71) Applicant: NETAPP, INC., Sunnyvale, CA (US)

(72) Inventor: Ravi Basrani, Bangalore (IN)

(73) Assignee: NETAPP, INC., San Jose, CA (US)

( * ) Notice: Subject to any disclaimer, the term of this patent is extended or adjusted under 35 U.S.C. 154(b) by 399 days.

(21) Appl. No.: 16/906,293

(22) Filed: Jun. 19, 2020

(65) Prior Publication Data

US 2020/0320037 A1 Oct. 8, 2020

Related U.S. Application Data

(62) Division of application No. 15/208,956, filed on Jul. 13, 2016, now Pat. No. 10,733,144.

(51) Int. Cl.
*G06F 16/13* (2019.01)
*G06F 16/14* (2019.01)
*G06F 16/17* (2019.01)

(52) U.S. Cl.
CPC .......... *G06F 16/137* (2019.01); *G06F 16/152* (2019.01); *G06F 16/1727* (2019.01)

(58) Field of Classification Search
None
See application file for complete search history.

(56) References Cited

U.S. PATENT DOCUMENTS

| | | | |
|---|---|---|---|
| 5,371,885 A * | 12/1994 | Letwin | ................ G06F 16/1794 |
| 5,617,552 A | 4/1997 | Garber et al. | |
| 5,623,654 A | 4/1997 | Peterman | |
| 5,675,778 A | 10/1997 | Jones | |
| 5,909,540 A * | 6/1999 | Carter | ................. G06F 11/1435 |
| | | | 711/E12.066 |
| 6,115,799 A | 9/2000 | Ogawa | |
| 6,246,682 B1 | 6/2001 | Roy et al. | |
| 6,510,439 B1 * | 1/2003 | Rangarajan | ........... G06F 16/972 |
| | | | 707/827 |
| 6,606,628 B1 | 8/2003 | Monsen et al. | |
| 6,625,591 B1 * | 9/2003 | Vahalia | ............... G06F 16/9014 |
| | | | 711/216 |
| 6,704,794 B1 | 3/2004 | Kejriwal et al. | |
| 7,103,616 B1 * | 9/2006 | Harmer | ............... G06F 16/9574 |
| 9,009,206 B1 | 4/2015 | Jernigan, IV et al. | |
| 9,020,977 B1 | 4/2015 | Schouten | |
| 10,417,190 B1 | 9/2019 | Donlan et al. | |
| 2002/0065810 A1 | 5/2002 | Bradley | |

(Continued)

*Primary Examiner* — Irene Baker

(74) *Attorney, Agent, or Firm* — Loza & Loza, LLP; Tejinder Singh

(57) ABSTRACT

Methods, non-transitory computer readable media, computing devices and systems for persistent indexing and space management for flat directory include creating, using at least one of said at least one processors, an index file to store mapping information, computing, using at least one of said at least one processor, a hash based on a lookup filename, searching, using at least one of said at least one processor, the index file to find all matching directory cookies based on the computed hash, selecting, using at least one of said at least one processor, the directory entity associated with the lookup filename from among the matched directory cookies, and returning, using at least one of said at least one processor, the determined directory entity.

20 Claims, 7 Drawing Sheets

(56) References Cited

U.S. PATENT DOCUMENTS

| | | |
|---|---|---|
| 2003/0208564 A1 | 11/2003 | Miyake et al. |
| 2004/0054839 A1 | 3/2004 | Lee et al. |
| 2004/0117408 A1 | 6/2004 | Bharadwaj et al. |
| 2004/0236897 A1 | 11/2004 | Cheng |
| 2007/0110062 A1 | 5/2007 | Balay et al. |
| 2008/0215834 A1 | 9/2008 | Dumitru et al. |
| 2009/0216980 A1* | 8/2009 | Asahi ................ H04L 63/0823 |
| | | 711/E12.001 |
| 2010/0185690 A1 | 7/2010 | Evans et al. |
| 2012/0005307 A1* | 1/2012 | Das .................... G06F 16/1727 |
| | | 709/219 |
| 2012/0011178 A1 | 1/2012 | Pfeifle et al. |
| 2012/0102289 A1 | 4/2012 | Maram et al. |
| 2016/0103764 A1 | 4/2016 | Banerjee et al. |

\* cited by examiner

PERSISTENT INDEXING AND FREE SPACE MANAGEMENT FOR FLAT DIRECTORY

CROSS-REFERENCE TO RELATED APPLICATION

This patent application filed under 35 USC § 121 is a divisional application of U.S. patent application Ser. No. 15/208,956, filed on Jul. 13, 2016, entitled "PERSISTENT INDEXING AND FREE SPACE MANAGEMENT FOR FLAT DIRECTORY," the disclosure of which is incorporated herein by reference in its entirety.

BACKGROUND

Technical Field

The present disclosure relates generally to an upgrade and revert friendly augmented data structure for a flat directory for fast lookup.

Description of Related Art

Directories are file system tools for grouping files together. Directory structures may be flat (linear) or hierarchical (where directories may contain sub-directories). In a flat format directory, all blocks are at the same level and contain just filename and file handles. As there are no index blocks, there is no hierarchy.

The above described flat directory format stores all data in different blocks on a disk. Accordingly, a lookup operation on a flat directory requires a reading of all the blocks from a disk until the desired filename is located. As a consequence, lookup on large directories can be very slow. This is also a problem for a free slot lookup on a flat directory format. A free slot lookup operation is conducted when a new entry is being added to a directory.

Therefore, there is a need for improved file system access to flat directories, access in order to provide a more efficient filename and free space lookup. In certain embodiment, such improvement can be achieved using persistent indexing and free space management.

Figure 1:
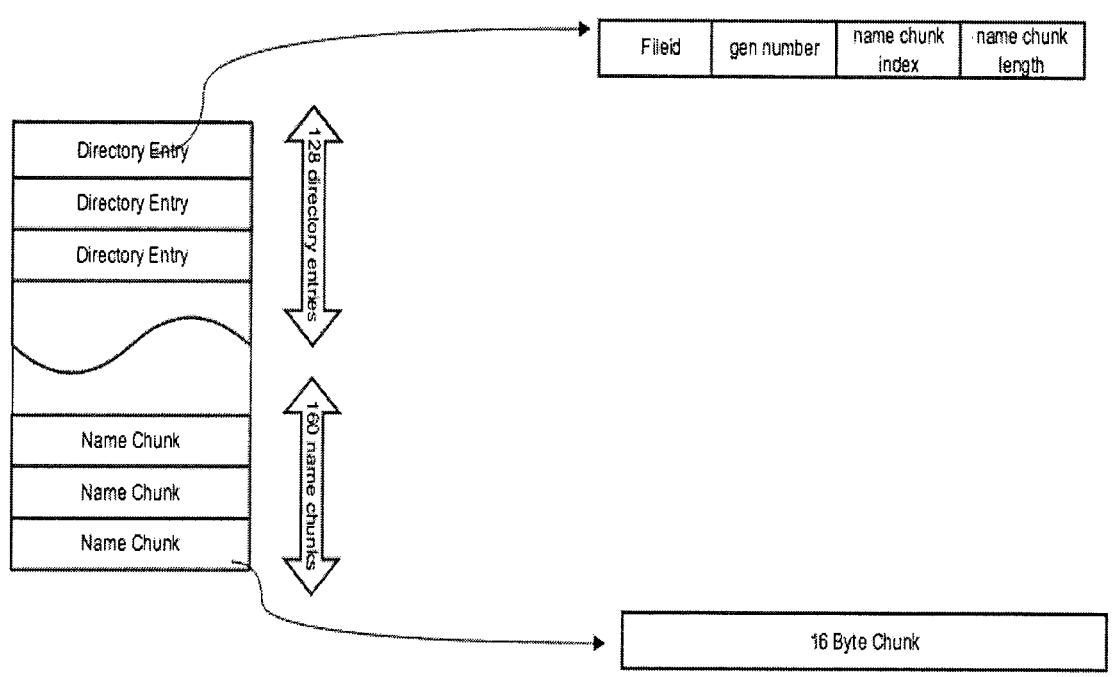
FIG. 1 depicts an exemplary embodiment of a flat directory format.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF THE DRAWINGS

The present disclosure is directed to systems, methods and non-transitory computer readable media for providing persistent indexing and free space management for a flat directory.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

It will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. Furthermore, flash disk arrays are also contemplated as a form of storage to which the concepts described below apply.

Referring now to the drawings, wherein like reference numerals refer to like features, there is shown in FIG. 1 a diagram of an exemplary flat directory format, wherein each block, in which data is stored, comprises 128 directory entries and 160 name chunks. As described above, directories are tools that file systems usually include to allow users/clients to group files together.

A directory entry is an entry which may comprise information such as File ID, name chunk index, information regarding how many name chunks are needed etc., but is not limited thereto. Each name chunk may be 16 bytes in size, according to an exemplary embodiment, but is not limited thereto.

In certain embodiments, in a flat directory format file system, each file stored on the disk is associated with one directory entry and multiple name chunks. When a client stores a file in a storage system using a flat directory format file system, the file system traverses each block in which data is stored on the disk to find the first free space to store the file.

Figure 6:
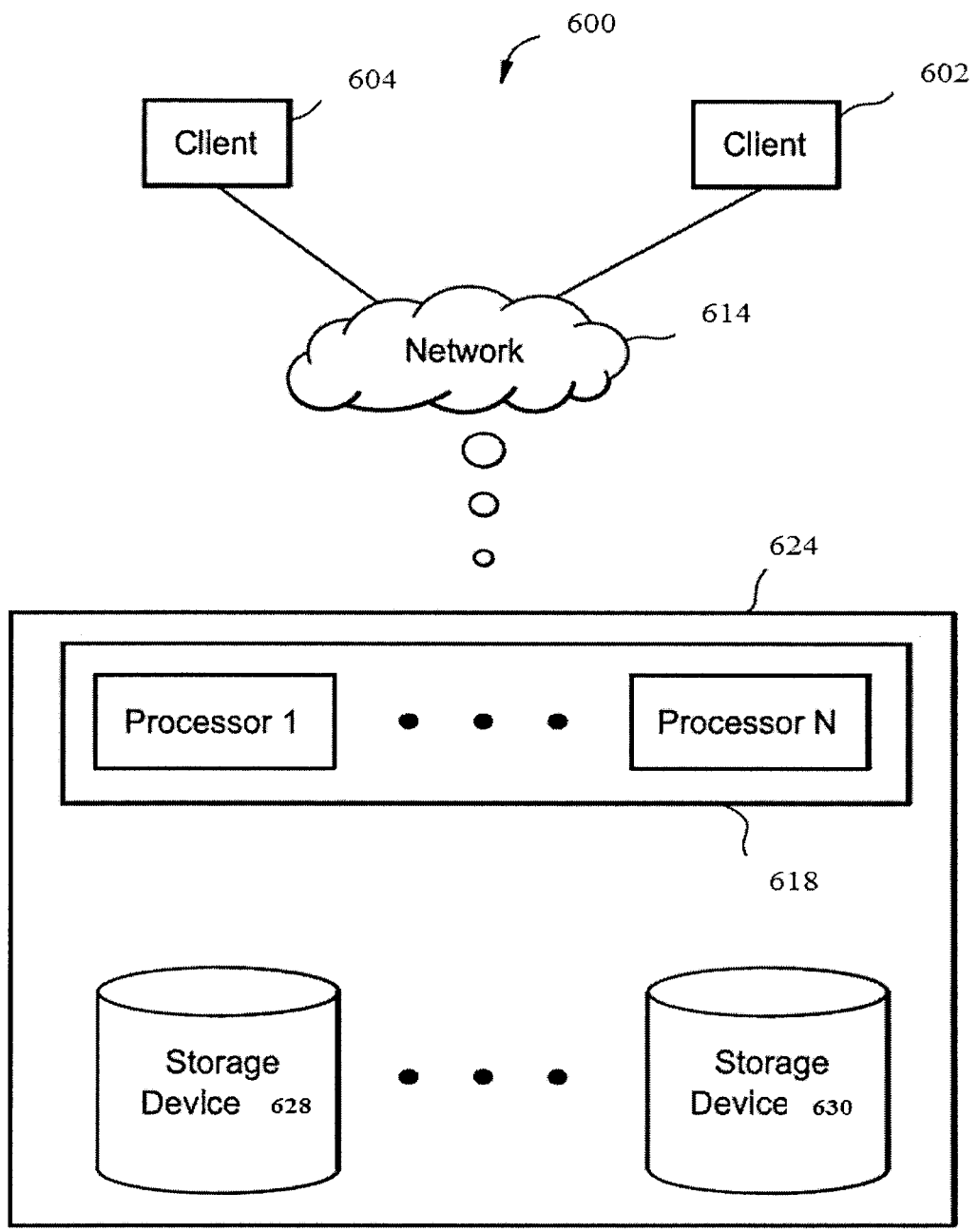
FIG. 6 depicts a block diagram of an example of a system, in accordance with an exemplary embodiment of the present disclosure.

The user, according to an exemplary embodiment, is a client communicating with the storage server, as depicted in FIG. 6, where the storage server 624 is configured to operate according to a client/server model of information delivery thereby allowing multiple clients to access files or other data simultaneously.

In this model, the client 602 or 604 may be a computer running an application, such as a file-system protocol. Each client, 602 and 604, may request the services of the storage server 624 by issuing storage-system protocol messages. For example, the clients, 602 and 604, can request to either read data from or write data to the storage server 624.

The communication between a client 602 and 604 may employ systems virtualized to run on the cloud using cloud based protocols, however, the usage is not limited thereto. This communication between the client 602 and 604 with the storage server 624 is further described in more detail below, with reference to FIG. 6.

Figure 3:
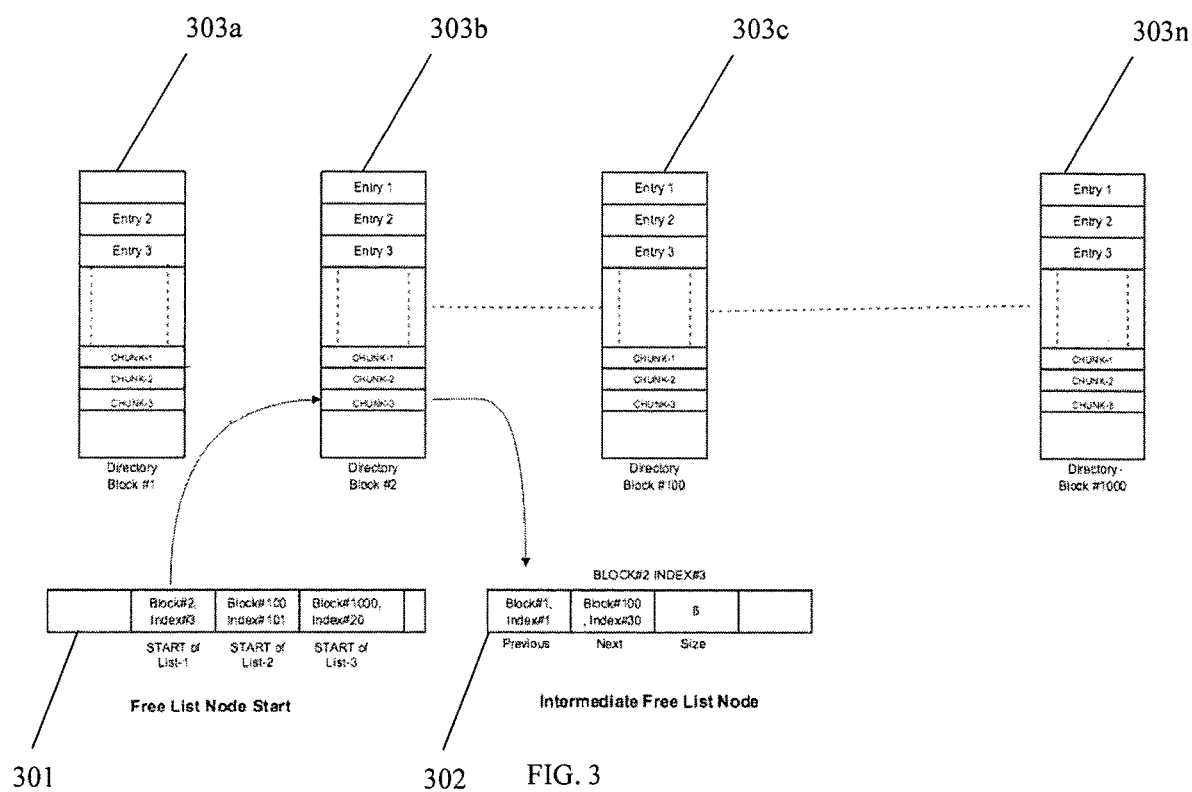
FIG. 3 depicts an exemplary embodiment of maintaining free lists for optimizing free space lookup in a flat directory.
Figure 5:
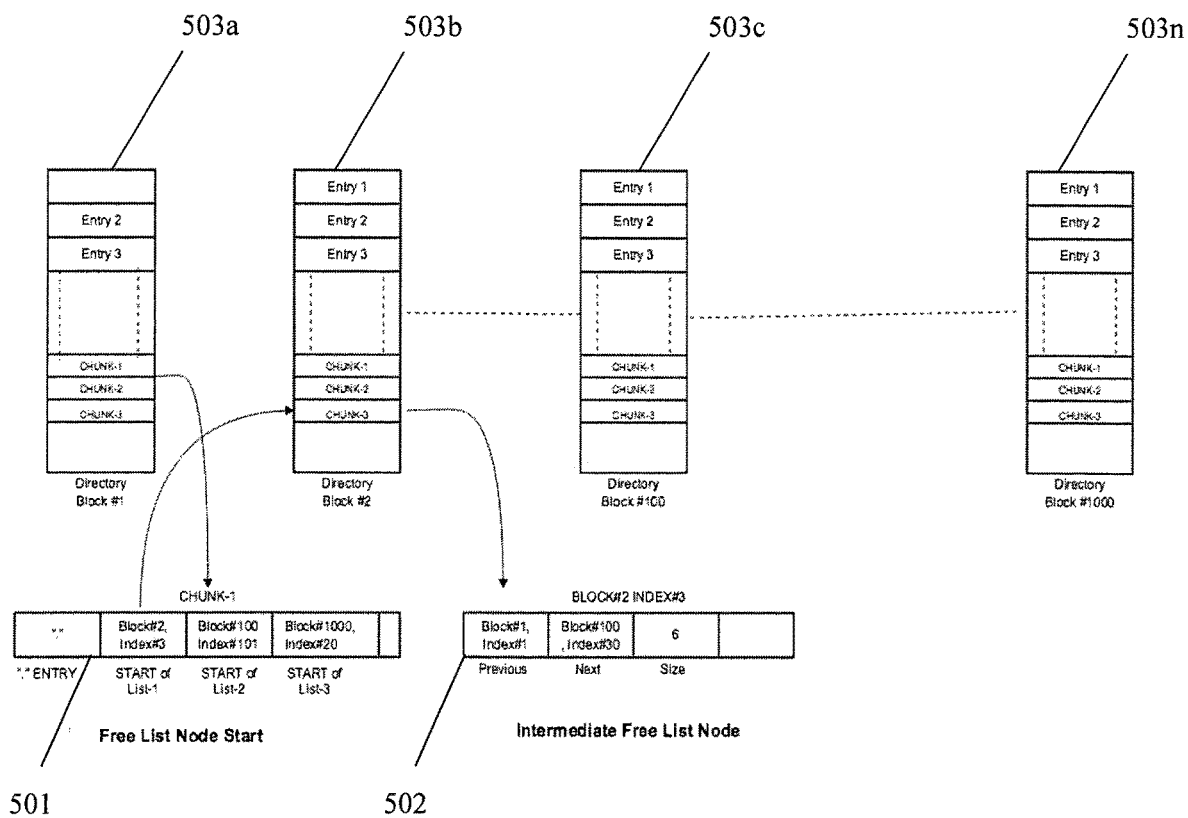
FIG. 5 depicts another an exemplary embodiment of maintaining free lists for optimizing free space lookup in a flat directory, without using the index file.

When a client looks up a file, for example one that needs to be extracted from the storage disk, or looks up free space for inserting a file, the flat directory format file system conducts a directory lookup operation. In certain embodiments, such a directory lookup operation may comprise using a directory file ID, filename or other information provided by the client. The lookup operation then returns a file handle, comprising information corresponding to the looked up information stored in the directory blocks, as depicted in FIGS. 1, 3 and 5, to the requesting party/client.

The methods and systems of persistent indexing and free space management for flat directory disclosed herein include creating an index file, the index file being a separate file from the flat directory format file system, which may store mapping information corresponding to data stored in the different blocks of the flat directory format file system for large directories.

The mapping information may include hash values of filenames (collection of values identified by a unique key) and location cookies to data stored in blocks (providing storage location information for a particulate file/data in a directory i.e. file block number (FBN) according to an exemplary embodiment). However, the information stored in the index file is not limited thereto.

The index file may be of B+ format, comprising a tree format wherein each node contains keys, in turn providing faster lookup in an optimal number of disk block read actions. The use of B+ format provides benefits such as optimized number of disk reads for lookup and keeping the index file size small while still providing lookup on large directory structures. The B+ format further provides faster lookup with the least number of disk block reads. According to an exemplary embodiment, a single block in a B+ format index file may incorporate 100 keys. Although benefits of B+ format are described above, it is merely an exemplary embodiment and the index file may use a different format.

Figure 2:
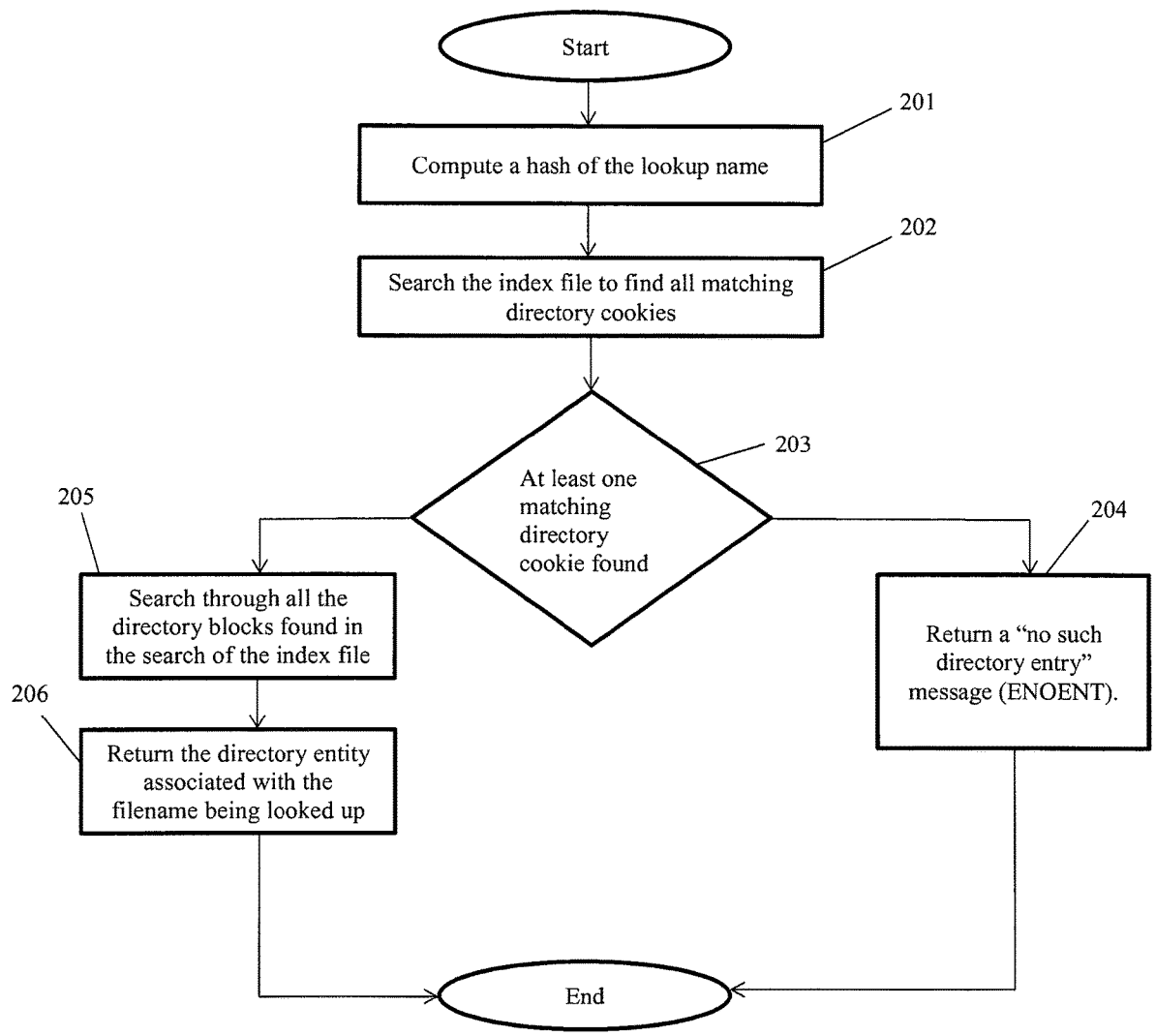
FIG. 2 depicts flow chart of the lookup process for the indexed backed directory.

FIG. 2 depicts a flow chart of the lookup process for the index backed directory. At 201, a hash of the filename being looked up is computed. If a B+ file format is used, the computed hash forms the key to the format index file. Following that, a search is conducted in the index file (which may be of B+ format) to find all matching directory entries and their location cookies, in step 202. The search result may incorporate more than one directory location cookie in a scenario where multiple location cookies are located from a searched filename.

In step 203, it is determined if the search retuned at least one matching directory location cookie, pointing to the block and index number where the searched filename is stored. If no directory location cookie is found in the index file, the process may return a "no such directory entry" message (ENOENT) in step 204 and then end the process.

However, if at least one matching directory block is found in step 203, then in step 205, all of the at least one directory blocks found in the search are read through. In step 206, the directory entity associated with the filename being looked up is returned. A similar process can be applied for free space lookup in a flat directory as well.

In a file system, Mode is a data structure used to represent a file or a directory. According to an exemplary embodiment, the on-disk Mode field may link both the directory blocks and the index file with each other. A link between the directory blocks and the index file, according to an exemplary embodiment, is depicted in FIG. 3.

For free space lookup, multiple link lists of free slots of different sizes may be maintained. A multiple link list is a list of free space locations maintained by storing and updating information within the free location itself. Specifically, each free location comprises a pointer to the next free location available for storage.

According to an exemplary embodiment, a flat directory format may include three free space lookup link lists, each representing availability of free storage locations of a specific size, the size ranging from a minimum length to a maximum length, where the minimum and maximum lengths are dependent on the minimum and maximum length of filename supported by the file system. Thus, according to an exemplary embodiment, a first free space lookup link list may include all free spaces of 64 bytes each and a second free space lookup link list may include all free spaces of 16 bytes each. The number of free space lookup link lists, in the exemplary embodiment, is not limited thereto and multiple free space lookup link lists may be included in a free directory format.

The start node of the link list, an exemplary embodiment of which is depicted in element 301 info FIG. 3, may be stored in a header of the index file. The start node contains a pointer to the first free location in the blocks of the flat directory format file system, thereby linking the index file with the directory blocks. A pointer to the previous and/or the next free location of that size is stored in the name chunk of the first free location itself.

As the name chunks of a free location only contain pointer values, which can be considered garbage during a reversion to an older file system version, the reversion process to an older file system format is very straight forward, merely requiring removal of the index file. Such a reversion may be needed if the entire storage is being changed to a different file system.

FIG. 3 depicts multiple blocks 303a, 303b, 303c . . . 303n in a directory with each block comprising the flat directory format depicted in FIG. 1. The free list node start 301 depicted in FIG. 3 is an exemplary embodiment of the header of the index file incorporating the start cookies of multiple free lists. As can be seen, free list node start 301 incorporates the start cookie of list-1 (block #2, Index #3) and start cookie of other lists of different sizes. Accordingly, whenever a lookup for a free slot is performed, the first free slot from one of the lists is looked up, based upon size requirement, from the header of the index file. The name chunk of the first free slot (intermediate free list node 302), which in this exemplary embodiment is directory block #2 303b, index #3, holds further information regarding the previous free slot, the next free slot and the size. However, the information being store in the free slot name chunk is not limited thereto.

Therefore, by using the above lists, free space lookup for large directories may be performed.

Figure 4:
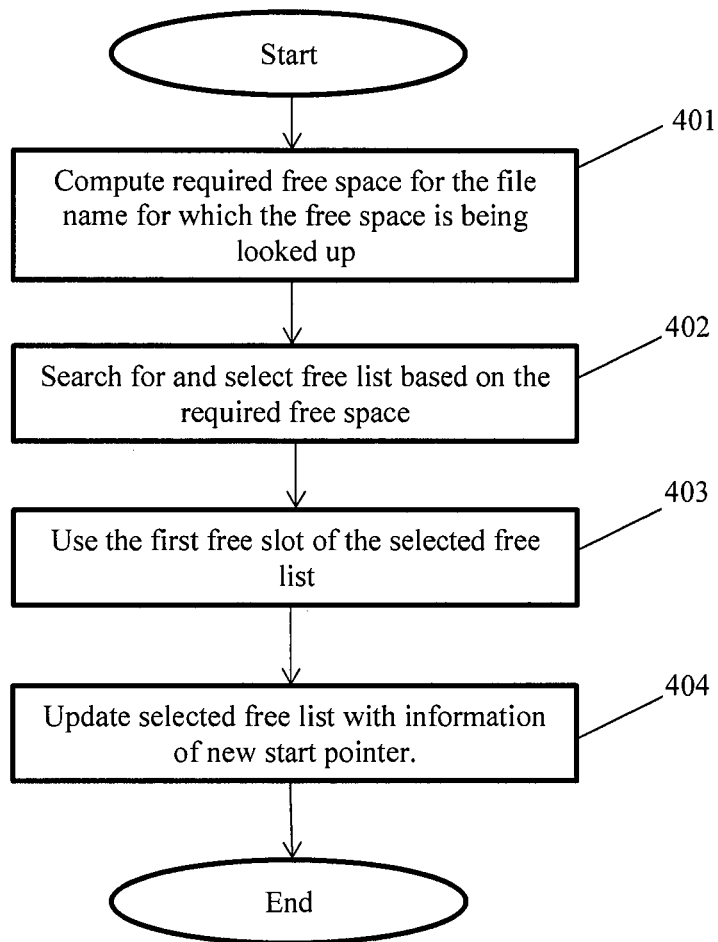
FIG. 4 depicts a flowchart depicting the process for free space lookup using free lists in a flat directory.

FIG. 4 depicts a flowchart of a process for free space lookup using free lists as described using the exemplary embodiment of FIG. 3 above.

In step 401, a computation is performed to determine the required free space for a filename. Based on the required free space, a search is conducted for the best fit free list from index file header in step 402. Once the appropriate free list is selected, the first free slot of the respective free list is used in step 403. In step 404, the index file header is updated with information of the new start pointer of the list. Information of the new start pointer of the list was stored as "next free slot" in the name chunk of the first free slot of the respective free list which is now being used, and therefore can be obtained easily. Thus, based on the above described process of preparing, maintaining and using the free lists, the process of free space lookup in a flat directory can be optimized.

FIG. 5 depicts another exemplary embodiment of maintaining free lists for optimizing free space lookup in a flat directory, without using the index file. FIG. 5 depicts multiple blocks 503a, 503b, 503c . . . 503n in a directory with each block comprising the flat directory format depicted in FIG. 1.

As can be seen in FIG. 5, the free list node start is stored in name chunk #1 of the directory block #1 instead of being stored in the separate index file. Therefore, a free list, as described above, may be created and maintained for optimized free space lookup without using the separate index file, according to an exemplary embodiment. According to another alternative exemplary embodiment, start pointers of the free lists may be stored in fixed location in the directory, such as the "." entry or ".." entry which are the first two entries of a directory, instead of using a separate index file.

Similar to the exemplary embodiment of FIG. 3, free list node start 501 incorporates the start cookie of list-1 (block #2, Index #3) and the start cookies of other lists of free slots of different sizes. Accordingly, whenever a lookup for a free slot is performed, the first free slot from one of the lists is looked up, based upon size requirement, from the directory block #1, name chunk #1. It should be noted that even though this exemplary embodiment stores the free list node start in directory block #1, name chunk #1, it is not limited thereto, and any other location in the directory may be used. The name chunk of the first free slot (intermediate free list node 502), which in this exemplary embodiment is directory block #2 503b, index #3, holds further information regarding the previous free slot, the next free slot and the size. However, the information being store in the free slot name chunk is not limited thereto.

Another advantage of storing indexes in a separate index file is to provide seamless upgrade or revert, to and from an older version of file system. Using a separate index file, as described above, one can simply remove the index file while reverting to an older version of the file system, and no structural change or change to the contents in the data blocks need to be made to the directory itself.

Other advantages in data management utility include functionality in replication (raw directory block replication) and backup restore. During replication and/or backup restore to an older version of the file system, it can be chosen not to replicate the index file. Furthermore, even with the use of the index file, an old lookup algorithm may still be used when indexing is not available for reasons which may include directory indexing being in progress, index file being corrupted, etc.

All directory operations result in significant performance gain in terms of number of disks read, CPU usage as well as memory usage. The above described processes also eliminate the limitations on the maximum directory size. Furthermore, an almost constant logarithmic time performance for directory operations is achieved based on the above described processes.

FIG. 6 depicts a block diagram of an example of a system 600, in accordance with an exemplary embodiment of the present disclosure. The system 600 includes clients 602 and 604 and storage server 624. The clients, 602 and 604, may be computers or other processing systems capable of accessing the storage server 624 either directly or indirectly over a network 614. The clients, 602 and 604, may access the storage server 624 over the network 614 using wireless or wired connections supporting one or more point-to-point links, shared local area networks (LAN), wide area networks (WAN), or other access technologies. These clients 602 and 604 may be accessing data, applications, raw storage, or various combinations thereof stored on the storage server 624.

According to the exemplary embodiment depicted in FIG. 6, the system 600 is a type of storage system that provides storage services to clients 602 and 604 using, for example, storage area network (SAN), network-attached storage (NAS), or other storage technologies processed on multiple processors 618. However, it should be appreciated that alternate embodiments of the multiprocessor system 600 may deliver other types of computer services on a multiprocessor platform. For example, the storage server 624 may include web server technologies that deliver web pages and web services to the clients, 602 and 604, over the Internet. In other embodiments, the storage server 624 may include other general purpose applications that can deliver various functionalities or data to the clients, 602 and 604.

The storage server 624 is configured to operate according to a client/server model of information delivery thereby allowing multiple clients to access files or other data simultaneously. In this model, the client 602 or 604 may be a computer running an application, such as a file-system protocol. Each client, 602 and 604, may request the services of the storage server 624 by issuing storage-system protocol messages. For example, the clients, 602 and 604, can request to either read data from or write data to the storage server 624.

In the exemplary embodiment depicted in FIG. 6, the storage server 624 is a file-level server, such as a server used in a NAS environment, a block-level storage server used in a SAN environment, or other storage systems capable of providing both file-level and block-level service. For example, the storage server 624 may use a combination of software and hardware to provide storage services including the organization of information on storage devices 628 and 630, such as disks. The storage server 624 includes a file system to organize logically the information as a hierarchical or other structure of directories and files on the disks 628 and 630.

Although the storage server 624 is illustrated as a single unit in FIG. 6, it can also be implemented in a distributed architecture. For example, the storage server 624 can be implemented with multiple distributed storage servers (not shown). Additionally, the storage server 624 can also include a physically separate network module and disk module (not shown), which communicate with other storage servers over an external interconnect. The network module functions as a front-end of the storage server 624, exporting services to the clients, 602 and 604. The disk module functions as the back-end, managing and implementing a parity de-clustered distribution of a RAID organization on the underlying storage of the storage server 624.

In a system 600, the storage server 624 uses two or more processors, as represented by processors 618, which may also include multiple core processor designs. The processors 618 represent two or more computational units available in the storage server 624, may be a physical aggregation of multiple individual processors that each individually execute threads.

Alternate implementations of processors 618 may be a single processor having multiple on-chip cores that may partition and share certain resources on the processor die such as the L1/L2 cache. Therefore, the term "processor," as used herein, could be applied to designs utilizing one core or multiple cores found on a single chip or die. Likewise, thread execution is used to describe the act of executing a set of related instructions on one or several processors. As used herein, a "thread" refers to a separate stream of execution that takes place simultaneously with and independently of other steams of execution. As an example, a thread can be a single sequence of instructions executed in parallel with other sequence of instructions, either by time slicing or multiprocessing. This allows a program to split itself into two or more simultaneously running tasks. Unlike processes, multiple threads can share state information of a single process, share memory, and other resources directly.

The storage system used to conduct the above described lookup operations may be hard disk drives, flash drives, a combination of hard disk drives and flash storage or other forms of storage well known to one of ordinary skill in the art.

As discussed above, another exemplary embodiment of systems which may employ usage of the above described lookup operations in a flat directory format file system may be systems virtualized to run on the cloud using cloud based protocols, however, the usage is not limited thereto.

Figure 7:
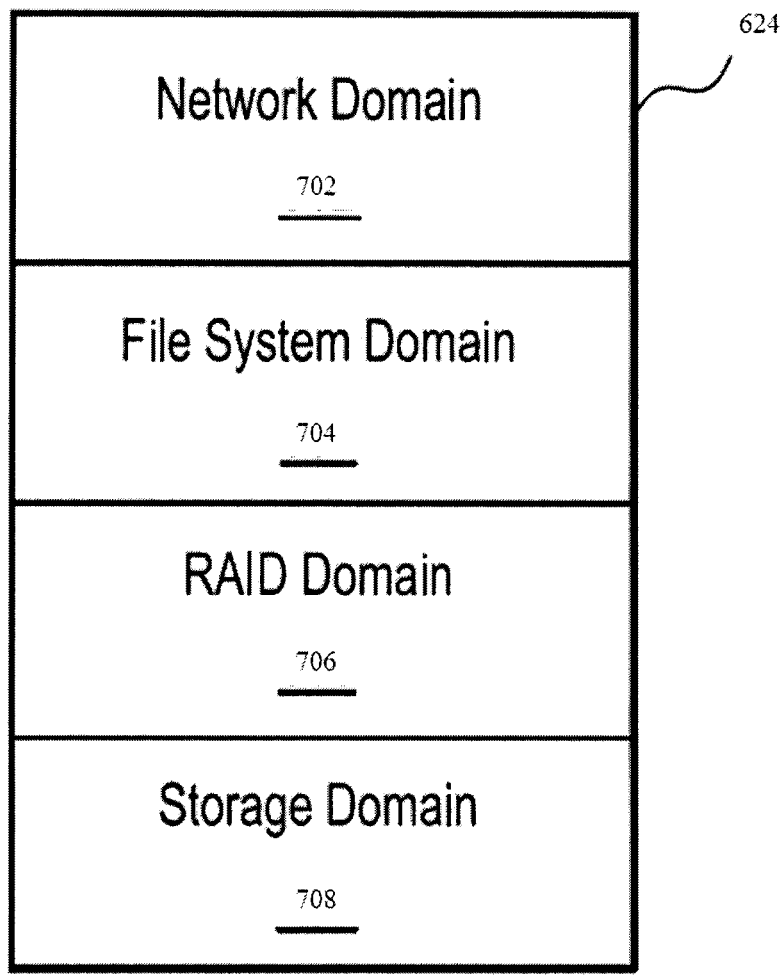
FIG. 7 depicts a block diagram illustrating examples of multiple domains, according to an exemplary embodiment.

In accordance with embodiments of the present disclosure, the storage server 624 can be configured to adjust a number of threads for execution by the processors 618 based on monitoring utilizations of multiple domains. FIG. 7 depicts a block diagram illustrating examples of multiple domains, consistent with an embodiment. It should be appreciated that threads to be executed are divided into a set of domains according to their functionality and tasks they perform. Therefore, a "domain," as used herein, refers to a grouping of threads based on a common functionality. Accordingly, threads are scheduled according to their assigned domain, which allow for multiprocessor parallel execution, in accordance with an embodiment of the present disclosure.

For example, as depicted in the exemplary embodiment of FIG. 7, a storage server may implement multiprocessing using the following set of domains: a network domain 702, file system domain 704, a RAID domain 706, and a storage domain 708. As implied by their names, the network domain 702 includes threads related to performing network specific functions. The file system domain 704 includes threads related to file system functions. The RAID domain 706 includes threads dealing with implementing the RAID functions and different levels of RAID (e.g., RAID-0 through RAID-5). The storage domain 708 includes threads directly related to operating storage devices.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to be limiting, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium may be included in a computer-readable storage device, a computer-readable storage substrate, a random or serial access memory array or device, or a combination of one or more of them. Moreover, while a computer storage medium is not a propagated signal, however a computer storage medium can be a source or destination of computer program instructions encoded in an artificially generated propagated signal. The computer storage medium can also be, or be included in, one or more separate physical components or media (e.g., multiple CDs, disks, or other storage devices such as flash drives, solid state drives etc.).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While a number of different exemplary embodiments of configuration are described above, it does not cover a comprehensive list of when dynamically changing the number of partitions at runtime might be beneficial. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects. An implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

It is to be understood that the embodiments are illustrative only. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A method, comprising:

creating, by a processor, an index file associated with a flat directory used by a file system of a storage system to store data, the index file storing mapping information including a hash value based on a file name of each flat directory file and an associated indication of a storage location storing data for each flat directory file, the index file linked with a plurality of free space linked lists, each linked list representing different available storage location size based on a range of file name sizes supported by the file system;

computing, by the processor, a hash value based on a lookup filename;

searching, by the processor, the index file to find a matching directory entry based on the computed hash value;

selecting, by the processor, a storage location associated with the matching directory entry;

returning, by the processor, the determined directory entity;

identifying, by the processor, a free space linked list from the plurality of free space linked lists; and selecting, by the processor, a storage location from the identified free space linked list to store data for a file name in the flat directory, the storage location linked to the index file.

2. The method of claim 1, wherein the index file is stored in a B+ format.

3. The method of claim 1, further comprising:

linking, by the processor, the index file to a first free storage location of each free space linked list.

4. The method of claim 1, further comprising:

updating, by the processor, the index file if at least one of content stored in the flat directory is edited and new content is stored in the flat directory.

5. A computing device, comprising:

a memory comprising machine executable code for performing a method;

at least one processor coupled to the memory, the processor configured to execute the machine executable code to cause the processor to:

create an index file associated with a flat directory used by a file system to store data, the index file storing mapping information including a hash value of a filename of each flat directory file and an associated indication of a storage location storing data for each flat directory file, the index file linked with a plurality of free space linked lists, each linked list representing different available storage location size based on a range of file name sizes supported by the file system;

compute a hash value based on a lookup filename;

search the index file to find a matching directory entry based on the computed hash value;

select a storage location associated with the matching directory entry;

return the determined directory entity;

identify a free space linked list from the plurality of free space linked lists; and select a storage location from the identified free space linked list to store data for a file name in the flat directory, the storage location linked to the index file.

6. The computing device of claim 5, wherein the index file is stored in a B+ format.

7. The computing device of claim 5, wherein the processor is further configured to execute the machine executable code to cause the processor to:

link the index file to a first free storage location of each free space linked list.

8. The computing device of claim 5, wherein the processor is further configured to execute the machine executable code to cause the processor to:

update the index file if at least one of content stored in the flat directory is edited and new content is stored in the flat directory.

9. A non-transitory, machine readable storage medium having stored thereon instructions for performing a method, comprising machine executable code which when executed by at least one machine, causes the machine to:

create an index file associated with a flat directory used by a file system of a storage system to store data, the index file storing mapping information including a hash value of a filename of each flat directory file and an associated indication of a storage location storing data for each flat directory file, the index file linked with a plurality of free space linked lists, each linked list representing different available storage location size based on a range of file name sizes supported by the file system;

compute a hash value based on a lookup filename;

search the index file to find a matching directory entry based on the computed hash value;

select a storage location associated with the matching directory entry;

return the determined directory entity;

identify a free space linked list from the plurality of free space linked lists; and select a storage location from the identified free space linked list to store data for a file name in the flat directory, the storage location linked to the index file.

10. The non-transitory storage medium of claim 9, wherein the index file is stored in a B+ format.

11. The non-transitory storage medium of claim 9, wherein the machine executable code further causes the machine to:

link the index file to a first free storage location of each free space linked list.

12. The non-transitory storage medium of claim 9, wherein the machine executable code further causes the machine to:

update the index file if at least one of content stored in the flat directory is edited, and new content is stored in the flat directory.

13. The non-transitory storage medium of claim 9, wherein a header of the index file links the index file to a free directory block for storing a flat directory entry.

14. The non-transitory storage medium of claim 9, wherein the index file is separate from the file system executed by the storage system.

15. The non-transitory storage medium of claim 9, wherein identify the free space linked list from the plurality of free space linked lists further comprises:
compute required free space for the file name to store data; and
utilize the required computed free space and the index file to select the free space linked list.

16. The method of claim 1, further comprising:
utilizing, by the processor, a header of the index file to link the index file to a free directory block for storing a flat directory entry.

17. The method of claim 1, wherein the index file is separate from the file system executed by the storage system.

18. The method of claim 1, wherein identifying, by the processor, the free space linked list from the plurality of free space linked lists, further comprising:
computing, by the processor, required free space for the file name to store data; and
utilizing, by the processor, the required computed free space and the index file to select the free space linked list.

19. The computing device of claim 5, wherein a header of the index file links the index file to a free directory block for storing a flat directory entry.

20. The computing device of claim 5, wherein the index file is separate from the file system executed by the computing device.

* * * * *